Aug. 13, 1957 — H. J. MARTIN — 2,802,489
COUPLING SLEEVE PRESS
Filed Oct. 29, 1954 — 6 Sheets-Sheet 1

INVENTOR.
Harold J. Martin
BY
Brown, Jackson, Boettcher & Dienner,
Attys.

Aug. 13, 1957    H. J. MARTIN    2,802,489
COUPLING SLEEVE PRESS
Filed Oct. 29, 1954    6 Sheets-Sheet 2

INVENTOR.
Harold J. Martin
BY
Brown, Jackson, Boettcher & Dienner
Attys.

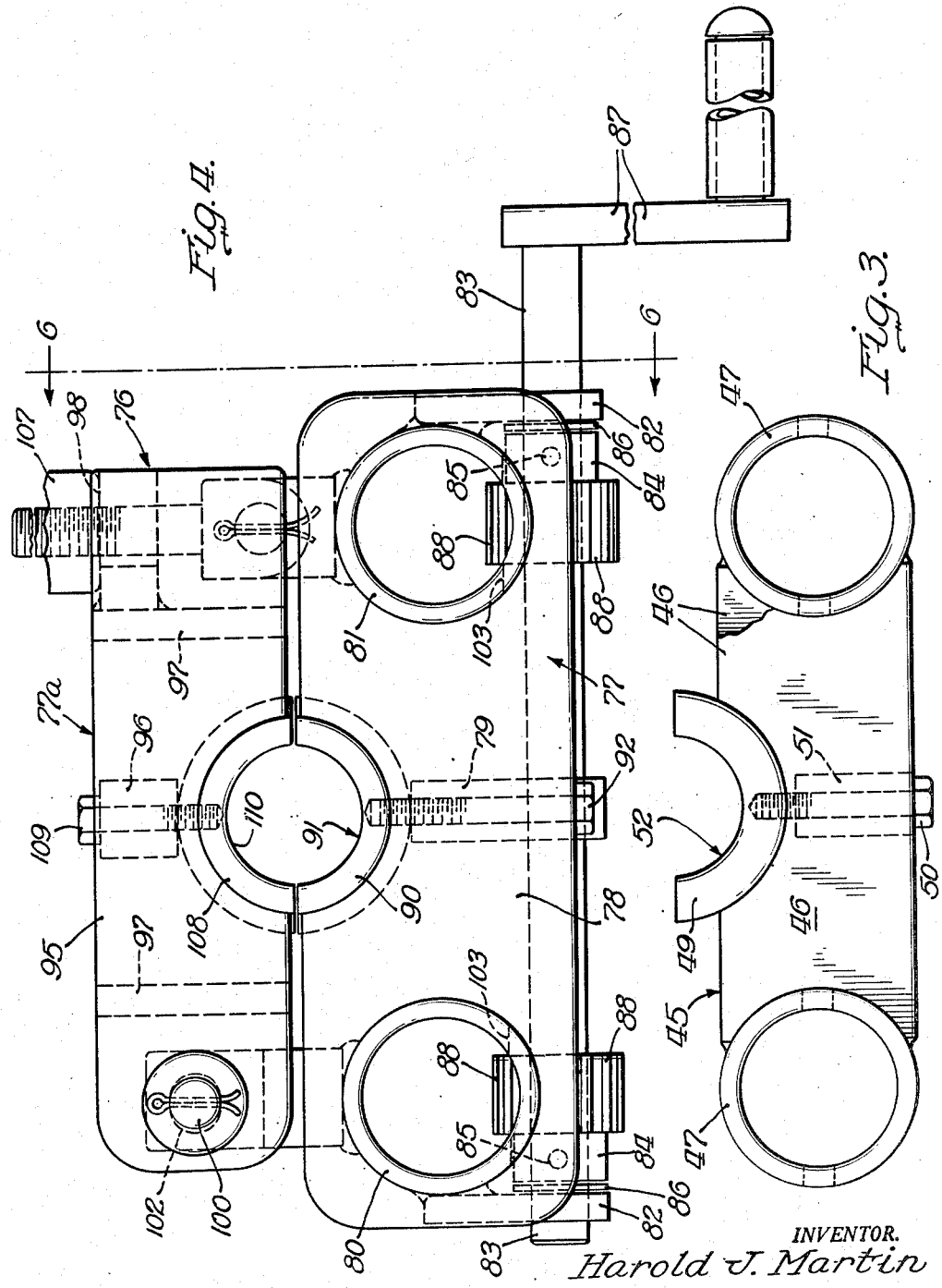

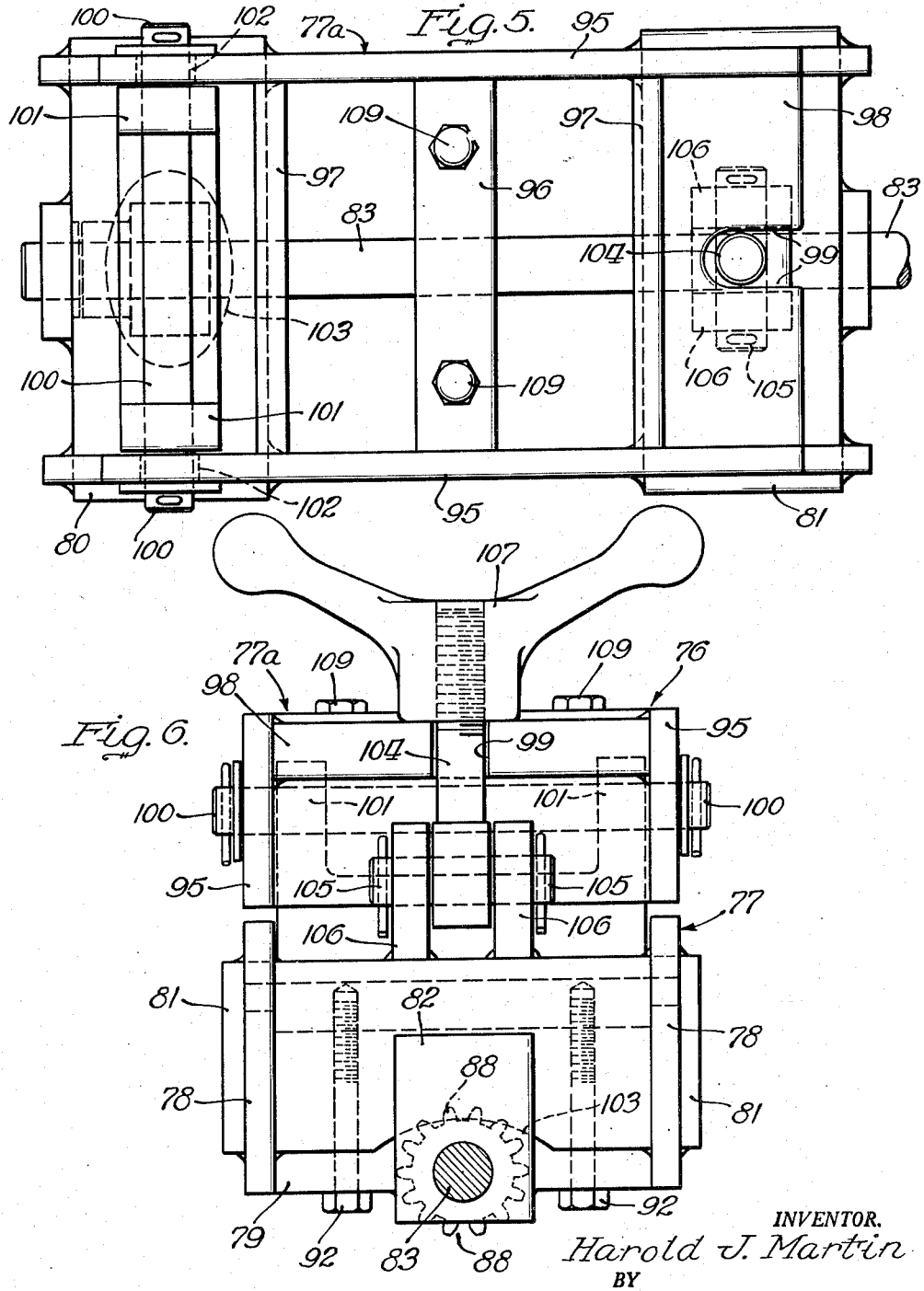

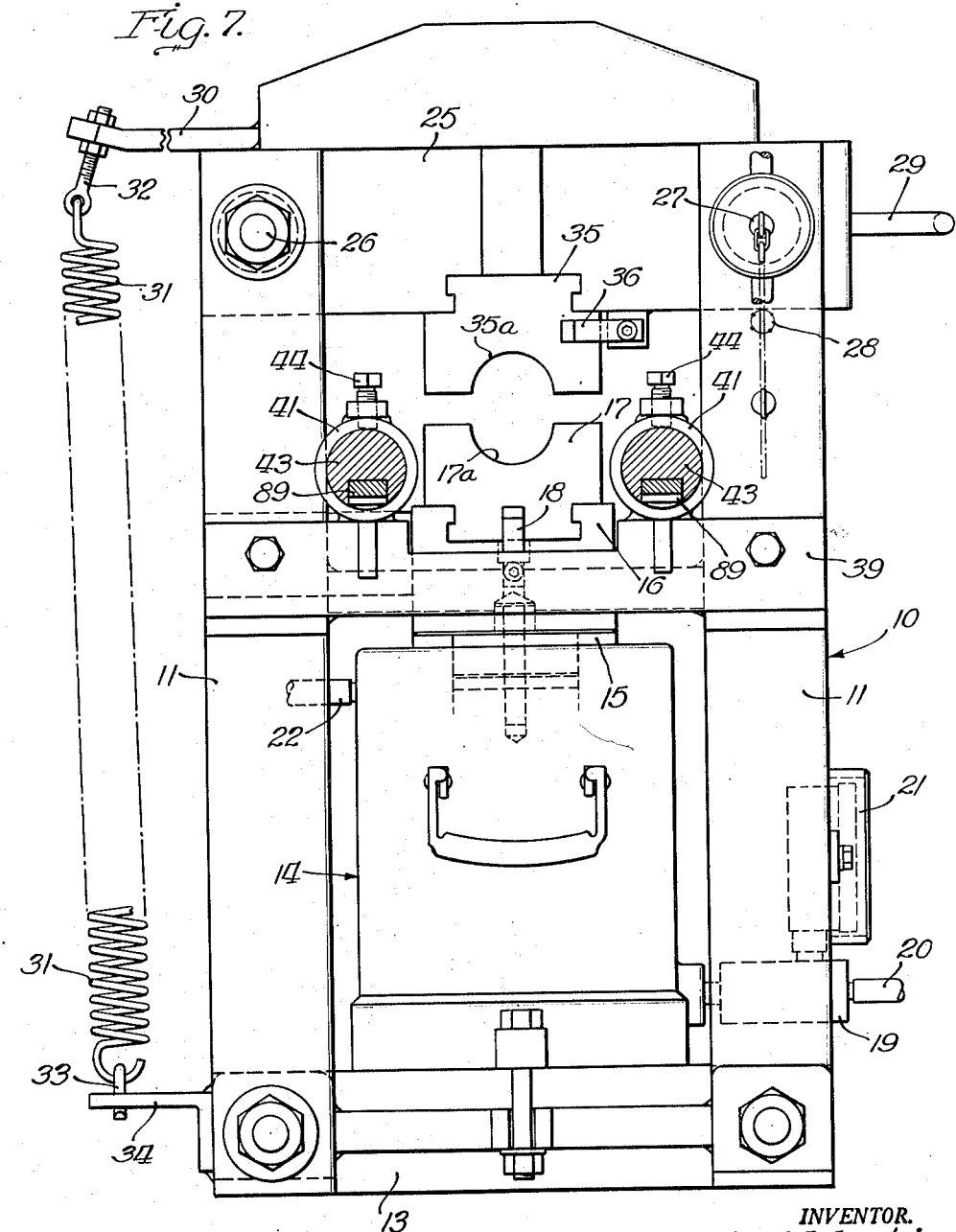

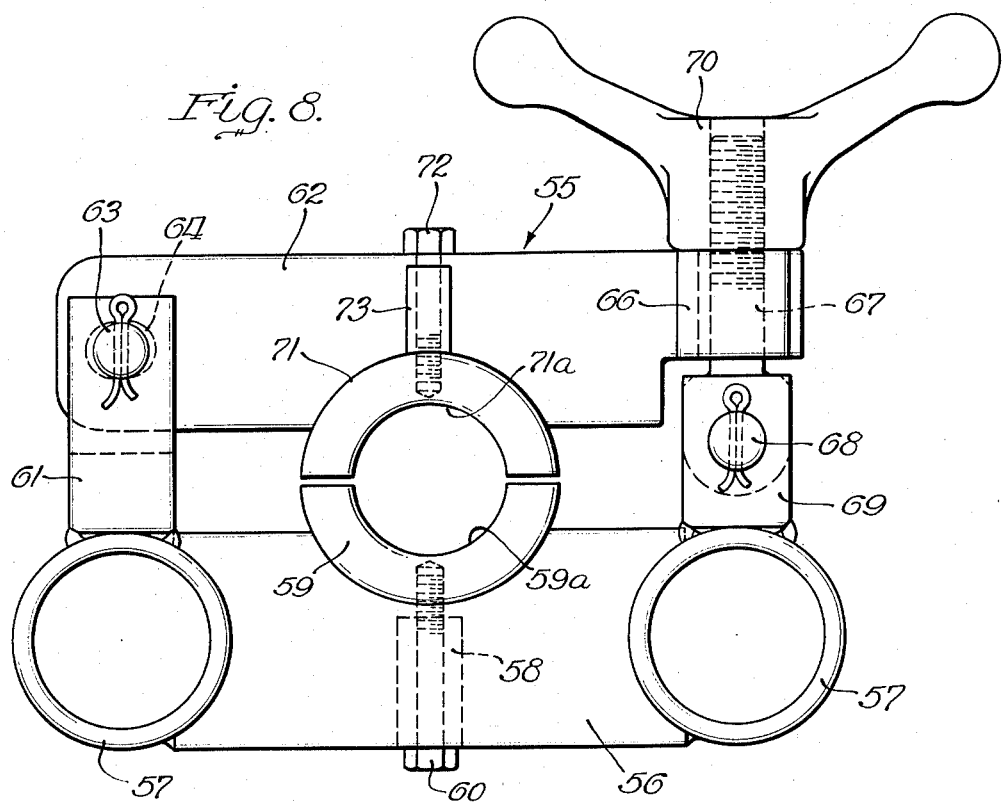
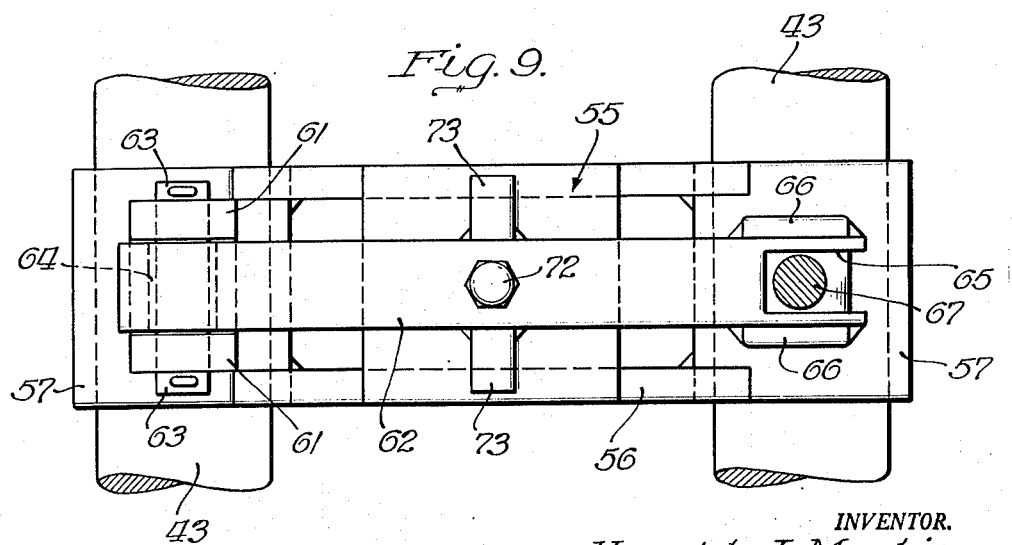

2,802,489
COUPLING SLEEVE PRESS

Harold J. Martin, Danville, Ind., assignor to The L. E. Myers Co., Chicago, Ill., a corporation of Delaware Application October 29, 1954, Serial No. 465,571

4 Claims. (Cl. 140—113)

This invention relates to presses, and has to do with a press for securing coupling sleeves on the adjacent ends of lengths of electric cable for joining them together.

It is known to join the ends of lengths of electric cable by coupling sleeves compressed tightly thereabout. The coupling sleeve is subjected to high pressure, usually in a hydraulic press, which compresses it tightly on the cable ends. In all of such presses with which I am familiar no means is provided for adequately supporting the cable ends during application thereto of the coupling sleeve. Frequently the cable ends sag to substantial extent with the result that the joint produced is defective and the cable may be deeply scored at the ends of the sleeve. That is objectionable, particularly when coupling together lengths of stranded soft aluminum high tension electric cable. Any marring or scratching of such cable causes the production of a strong corona effect, when the cable is energized, particularly at high voltage, which is a source of power loss and causes substantial electric and magnetic interference with telegraph, telephone, radio and television, on communication networks.

My invention is directed to a coupling sleeve press which avoids the objections to the known presses referred to above. To that end I provide means for guarding against sag of the cable ends during application thereto of the coupling sleeve. More particularly, the cable ends are gripped and supported by travelling carriage and clamp means effective for preventing sagging of the cable ends. The carriage and clamp means has associated therewith adjusting means whereby the cable ends, with the coupling sleeve thereof, may be advanced with expedition and facility between the dies for compressing the sleeve step by step throughout its full extent while the cable ends are maintained straight without any sag and in accurate alignment. Further objects and advantages of my invention will appear from the detail description.

In the drawings:

Figure 3 is an end view, on an enlarged scale, of the guide bars and one of the fixed cable guides thereon;

Figure 4 is a sectional view, on an enlarged scale, taken substantially on line 4—4 of Figure 2, showing in end view the adjustable carriage clamp;

Figure 5 is a plan view of the carriage clamp of Figure 4;

Figure 6 is a side view of the carriage clamp of Figure 4 taken substantially on line 6—6 of the latter figure;

Figure 7 is a sectional view taken substantially on line 7—7 of Figure 2;

Figure 8 is a sectional view, on an enlarged scale, taken substantially on line 8—8 of Figure 2, showing in end view the slidable cable clamp; and Figure 9 is a plan view of the slidable cable clamp of Figure 8.

Figure 1:
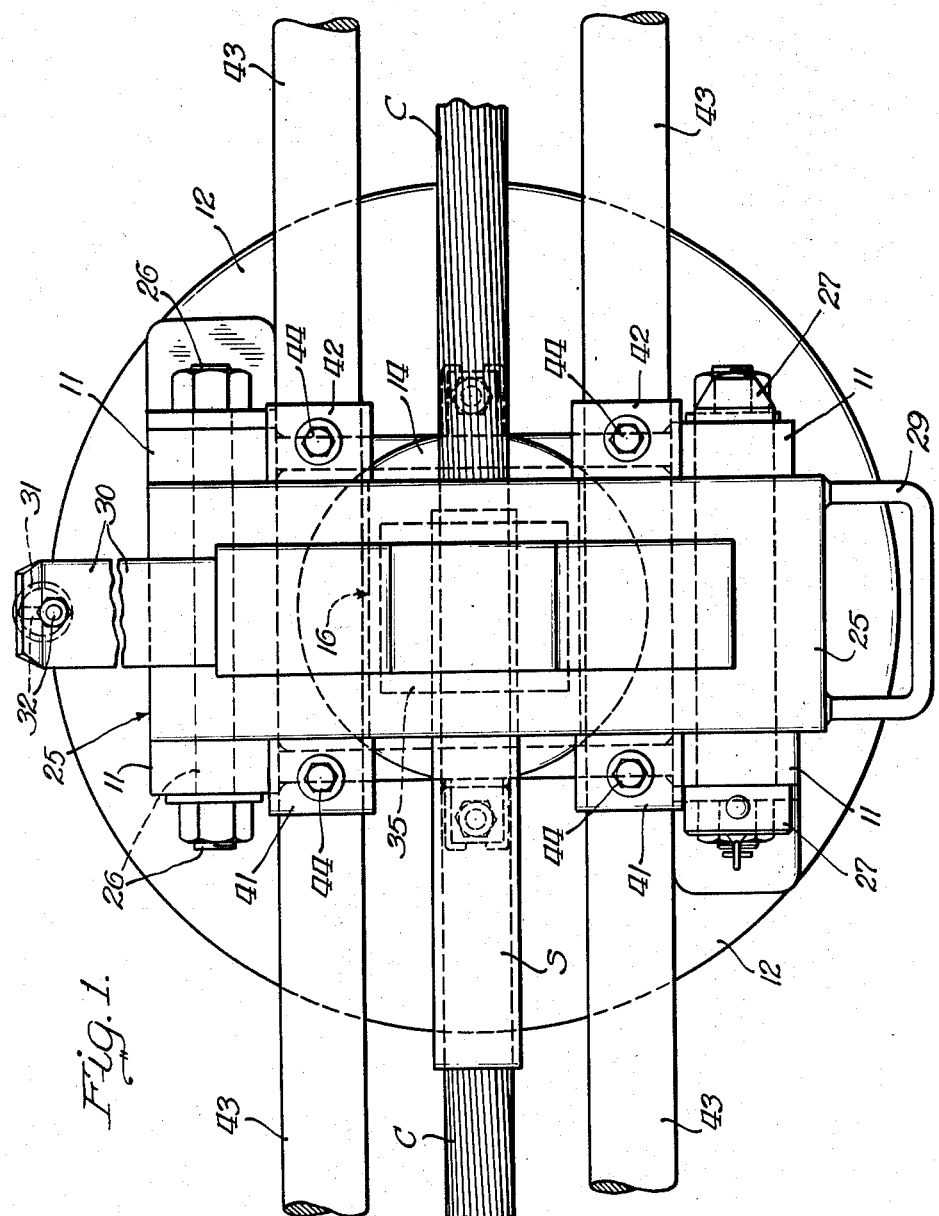
Figure 1 is a plan view, with the guide bars partly broken away, of a coupling sleeve press embodying my invention.

The press comprises a frame 10 rectangular in plan and having corner uprights 11 suitably secured to a turntable 12. A base structure 13 is secured in the lower portion of frame 10 and supports a press cylinder 14 suitably anchored thereto. A piston or ram 15, operable in cylinder 14, carries a lower die block 16 suitably mounted thereon. A lower die 17 is mounted in block 16 and retained against displacement therein by a locking clip 18. An adaptor 19 is connected to cylinder 14 at one side and adjacent the bottom thereof and provides means for connecting a high pressure hose 20 to the interior of cylinder 14. A pressure gauge 21, mounted on the adjacent side of frame 10, is also connected to the adaptor 19. A high pressure hose 22 is connected to the cylinder 14 at the other side and adjacent the top thereof. Suitable known means (not shown) is provided for supplying a hydraulic fluid, such as oil, under appropriate pressure to either of the hose lines 20 and 21, selectively, and exhausting the hydraulic fluid through the other hose line, rendering the press double acting. While the means shown for raising and lowering the lower die 17 is preferred, within the broader aspects of my invention any suitable means may be provided for that purpose.

An upper platen 25 is pivoted at one end, at 26, between two of the uprights 11 at one side of the frame 10. At its other end the platen 25 fits between the two uprights 11 at the other side of frame 10 and normally is locked therein by a lock pin 27 inserted through aligned openings in the uprights 11 and platen 25. Downward movement of platen 25 about its pivot pin 26 is limited by a stop pin 28 extending between and secured in the two uprights 11 receiving lock pin 27 to assure proper positioning of platen 25 in its normal lowered position. A handle 29 is suitably secured, conveniently by welding, to the end of platen 25 which receives locking pin 27, to facilitate raising and lowering of platen 25. An arm 30 is suitably secured, conveniently by welding, to the pivoted end of platen 25 and projects a substantial distance outward therebeyond. The outer end of arm 30 is attached to the upper end of a tension spring 31, by means of an eye bolt 32, the lower end of spring 31 being anchored at 33 to an angle bracket 34 welded to the base structure 13. As will be understood from what has been said, when the locking pin 27 is withdrawn to release the corresponding end of platen 25, the tension spring 31 assists in swinging platen 25 about its pivot pin 26 into open or raised position. A die 35 is mounted in platen 25 and is restrained against displacement therein by a locking clip 36. The upper die 35 is aligned with the lower die 17, as will be understood, and the dies 35 and 17 are provided in their opposed faces with recesses of appropriate form and size for compressing a coupling sleeve about the adjacent ends of cable lengths.

Two cross bars or hangers 39 and 40 are mounted on the uprights 11 at the ends of frame 10 a short distance above the cylinder 14. Two sleeves 41 are welded to the cross bar or hanger 39 at opposite sides of and equidistant from the lower die 16 and parallel with the lengthwise axis thereof. Two sleeves 42, of the same diameter as the sleeves 41, are welded to the cross bar or hanger 40 and are aligned lengthwise of the frame 10 with the sleeves 41. An elongated guide bar 43 of cylindrical cross section fits snugly through the two aligned sleeves 41 and 42 at each side of the lower die 17 and is tightly secured in the sleeves by set screws 44. The bars 43 are connected at each end thereof by a stationary guide 45 comprising plates 46 and a sleeve 47 welded to each end of the plates. The sleeves 47 fit snugly over the ends of the bars 43 and are secured thereto by bolts 48 passing through sleeves 47 and through the bars. A guide member 49 of substantially semi-circular shape seats in corresponding recesses in the upper edges of the plates 46 and is secured in position by a cap screw 50 passing through bridge member 51 welded to plates 46 centrally thereof, cap screw 50 threading into member 49 at the central area of the latter. The guide members 49 are provided in their upper faces with arcuate recesses 52 for reception of the cable ends, the recesses 52 of the guides 45 being aligned lengthwise of the guide bars 43 with each other and with the recesses in the faces of the dies 17 and 35.

A clamp 55 is slidably mounted on the guide bars 43 at one side of the dies 17 and 35. The clamp 55 includes a lower member comprising two parallel plates 56 to the ends of which are welded sleeves 57 snugly fitting about and slidable on the bars 43. The plates 56 are connected at their midlength by a bridge member 58 welded thereto. A semicircular clamp jaw 59 seats in corresponding recesses in the upper edges of the plates 56 and is secured in position by a cap screw 60 passing through bridge 58 and screwing into the member 59. A U-shaped bracket 61 is welded to the upper portion of one of the sleeves 57 and receives one end of an upper clamp member 62 pivoted on a pin 63 passing through the arms of bracket 61 and through the slightly elongated opening 64 in member 62. The other end of member 62 is provided with a lengthwise slot 65 and with reinforcing cleats 66 welded to member 62 at the sides of the slot 65 to provide effective reinforcement therefor. The slot 65 receives a swing bolt 67 pivoted at its lower end, at 68, between two uprights 69 welded to the upper portion of the other sleeve 57 of the lower clamp member. A handle nut 70 screws onto the upper end of swing bolt 67 and overlies the work end of the upper clamp member 62 for forcing the latter toward the lower member. A semi-circular upper clamp jaw 71 is secured to the upper clamp member 62 by a cap screw 72 passing therethrough, there being lugs 73 welded to the opposite sides of clamp member 62 and contacting the upper portion of jaw 71 for restraining it against tilting movement. The jaws 59 and 71 are provided in their opposed faces with arcuate recesses for engagement about the cable, as will be understood.

An adjustable clamp carriage 76, shown more clearly in Figures 4 to 6, inclusive, is slidably mounted on the guide bars 43 at the other side of the dies 17 and 35. The carriage 76 includes a lower member 77 and an upper member 77a. The lower member 77 comprises side plates 78 connected together at midlength by a bridge member 79 welded thereto. Sleeves 80 and 81 extend through the plates 77 adjacent the ends thereof and are welded thereto. The sleeves 80 and 81 fit snugly about the guide bars 43 for sliding movement thereon. Bearing plates 82 are welded to the outer sides of sleeves 80 and 81 and extend downward therebeyond. A shaft 83 is rotatably mounted in the plates 82 and the bridge member 79 and is restrained against endwise movement by stop collars 84 releasably secured on shaft 83 by set screws 85, with washers 86 on shaft 83 interposed between the respective collars 84 and the inner face of the adjacent bearing plate 82. Shaft 83 extends outward an appreciable distance beyond the sleeve 81 and has secured thereon a crank handle 87 for rotating shaft 83 in desired direction. Two spur pinions 88 are mounted on shaft 83 and are fixed to the collars 84, conveniently being integral therewith, for rotation with the shaft 83. The pinions 88 mesh with rack bars 89 secured to the guide bars 43 in lengthwise grooves at the lower sides thereof and extending from the ends of the bars to the frame 10. As will be understood from what has been said, the carriage 76 may be adjusted to desired extent along the guide bars 43 by turning shaft 83 in appropriate direction. A lower shouldered semi-circular clamp jaw 90, provided in its upper face with a semi-circular recess 91, fits between the plates 78 and seats in semi-circular recesses in the upper portion thereof. The jaw 90 is secured in position by cap screws 92 passing through bridge member 39 and screwing into jaw 90.

The upper member 77a of carriage 76 comprises parallel sides plates 95 connected by a central bridge member 96 welded thereto. Bridge members 97 extend between the plates 95 and are welded thereto at opposite sides of the bridge member 96, and a horizontal plate 98 extends between and is welded to the plates 95 and to the outer face of one of the bridge members 97. The plate 98 is positioned adjacent the upper edges of the plates 95, as is shown more clearly in Figure 4, and is provided with a central slot 99 for a purpose to be explained presently. The plate 98 is disposed adjacent one end of the member 77a the other end of which is pivoted, by a pin 100, to a U bracket 101 welded on the top of sleeve 80, pin 100 passing through slightly elongated openings 102 in plates 95 and through the arms of the U bracket 101. The sleeves 80 and 81 are provided with openings 103 in their lower portions to accommodate the pinions 88, as shown more clearly in Figure 5. A swing bolt 104 is pivoted at its lower end on a pin 105 passing through two uprights 106 welded to the top of the sleeve 81. A handle nut 107 is threaded on the swing bolt 104 and when the latter is engaged in slot 99 contacts the upper face of plate 98 for forcing the upper member 77a of carriage 76 toward the lower member 77, as will be understood. A shouldered semi-circular upper clamp jaw 108 fits between the plates 95 with its end portions seating in corresponding recesses therein. The jaw 108 is secured in position by cap screws 109 passing through bridge member 96 and threading into the jaw 108. This jaw 108 is provided with a semi-circular recess 110 opposed to the recess 91 of the lower jaw 90.

Figure 2:
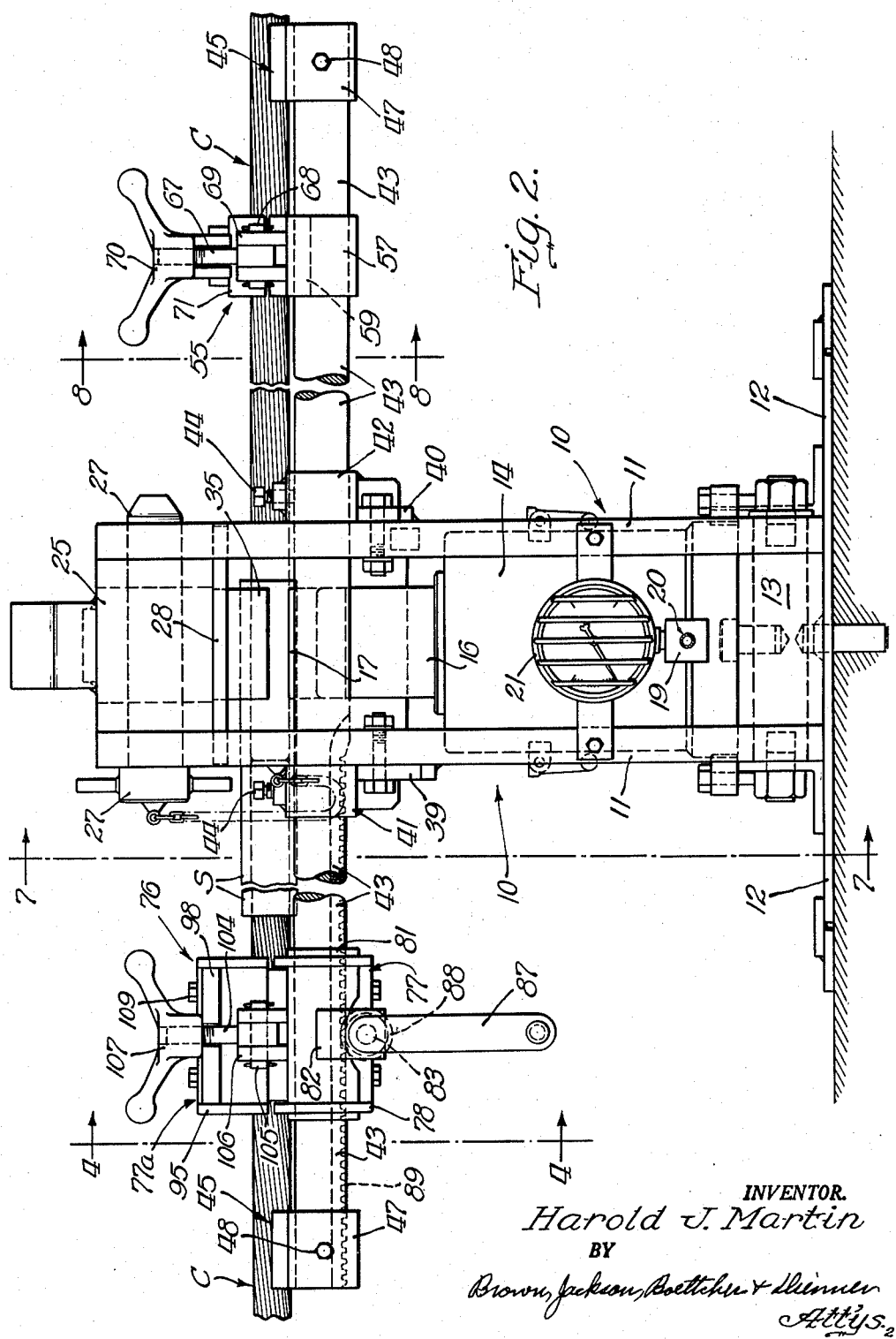
Figure 2 is a side view of the press of Figure 1.

When using the press for applying a coupling sleeve to the cable ends to be joined, the end portions of the lengths of cable are placed in the recesses 52 of members 49 of the stationary guides 45 and in the recess 59a of jaw 59 of the slidable clamp 55, with a thick walled coupling sleeve of aluminum fitting snugly on the ends of the cable lengths C and the end faces of the latter in contact. The sleeve S is of considerably greater outside diameter than the cables C and is disposed with one end portion—the left end portion as viewed in Figures 1 and 2—seating in the lower clamp jaw 90 of the adjustable clamp carriage 76. The coupling sleeve S is of substantial length—approximately 30 inches—and the other or right hand end portion thereof seats in the recess 17a of the lower die 17, it being noted that the radius of recess 17a is less than the radius of recess 91 of jaw 90, the recess 35a of die 35 being of the same radius as recess 17a of die 17. The slidable clamp 55 and the adjustable clamp carriage are opened, as is the upper platen 25, for positioning the cable ends with the coupling sleeve thereon in the manner stated. After the cable ends and the coupling sleeve thereon have been properly positioned in the press, the sliding clamp 55 is closed so as to grip the right hand cable end tightly between the jaws 59 and 71, it being noted that the recess 71a of jaw 71 is of the same radius as recess 59a of jaw 59. The upper platen 25 is also closed and secured in closed position and the adjustable clamp carriage is closed, the left hand cable end being then tightly gripped between the jaws 90 and 108. The cable ends, with the coupling sleeve thereon, are now supported in the press free of any sag and with the cable ends in accurate alignment and straight lengthwise, a portion of the coupling sleeve S to the right hand side of center thereof seating in the lower die 17 and extending into the recess 35a of the upper die 35 in substantial contact therewith. The lower die 17 is now forced upward under high pressure effective for compressing the coupling sleeve S about and securing the same to the corresponding cable end C. The lower die 17 is then lowered and the clamp carriage 76 is adjusted along the guide bars 43 toward the dies 17 and 35 a distance corresponding to the length of such dies, after which the lower die 17 is again forced upward compressing a further lengthwise area of sleeve S about the cable ends. In that manner, the sleeve S and the two cable ends are advanced step-by-step between the dies 17 and 35 and are secured together by compressing the sleeve in the manner stated. Once the two cable ends have been clamped together by compression of the central portion of the sleeve S, the assembly of the cable ends and sleeve may be reciprocated back and forth to accommodate step by step compression of the entire sleeve from the central portion outwardly to the ends thereof. After the coupling sleeve S has thus been fully compressed about and tightly secured upon the cable ends, the slidable clamp, the upper platen and the clamp carriage are opened, permitting the coupled together cable ends to be removed in a generally upward and outward direction, from the press, after which the operation may be repeated for coupling together two other cable ends.

It will be understood that changes in detail may be resorted to without departing from the field and scope of my invention, and I intend to include all such variations, as fall within the scope of the appended claims, in this application in which the preferred form only of my invention has been disclosed.

I claim:

1. In a press for applying coupling sleeves to cable ends, upper and lower dies for receiving a coupling sleeve between them and compressing it radially, means for closing said dies under pressure on the sleeve, a rigid guide track at opposite sides of and extending a substantial distance beyond the ends of said dies parallel to the longitudinal axis of said dies, cable end supports fixedly connected to the ends of said track in axial alignment with said lower die lengthwise of said track, a first cable clamp freely slidable on said track between one of said supports and said dies and having cable engaging clamp jaws axially aligned with said dies and said supports, a cable clamp carriage slidably mounted on said track between the other of said supports and said dies and having cable engaging clamp jaws axially aligned with said dies, said supports and said clamp jaws of said first cable clamp, said track interfitting with said first cable clamp and said carriage to retain said first cable clamp and said carriage against all movement other than sliding movement lengthwise of said track, and means for positively propelling said carriage in either direction along said track.

2. Apparatus for securing a coupling sleeve about the abutting ends of two large diameter electrical conductor cables rigidly to unite the cables, comprising a rigid frame, an elongate guide track rigidly supported on said frame and extending a considerable distance to opposite sides of said frame, cable supports fixedly secured in axial alignment to the opposite ends of said track each to support a cable at some distance from the end thereof, a cable clamp freely slidable on said track between said frame and one of said supports normally in spaced relation to said one support, said cable clamp including opposed jaws aligned axially with said supports to grip the cable supported by said one support in spaced relation to the end thereof, a cable carriage slidably mounted on said track between said frame and the other of said supports normally in spaced relation to said other support, said cable carriage including opposed jaws aligned axially with said supports to grip the cable supported by said other support in spaced relation to the end thereof, said track interfitting with said cable clamp and said carriage to retain the same against movement other than sliding movement lengthwise of said track, said cable clamp, said cable carriage and said supports rigidly retaining the two cables in axial alignment with the abutting ends thereof initially disposed within said frame with the coupling sleeve fitting over the abutting ends of the cables, a pair of opposed dies of a length less than the sleeve mounted on said frame to encircle the coupling sleeve and the cables in axial alignment with said jaws and said supports, means for closing said dies under pressure onto the sleeve to compress initially a portion of the sleeve onto the end of the cable retained by said cable clamp and subsequently to release the sleeve and cables, and means for positively propelling said carriage toward and away from said dies initially to propel the same toward said dies to move the cables and the sleeve relative to said dies to dispose another portion of the sleeve within said dies, said means for closing said dies onto another portion of the sleeve to compress the same onto the end of the cable retained by said carriage mechanically to connect the cable ends by the sleeve, the two said means thereafter being operable in sequence incrementally to compress the full length of the sleeve step by step onto the cables from the central portion to the outer ends thereof, whereby the cables are not scratched by the apparatus and the sleeve does not bite angularly into the cable thus eliminating sources of electrical corona effect, and whereby the sleeve is maintained straight before, during and after securement thereof to the cable ends.

3. In a press for applying a coupling sleeve to two cable ends, vertically opposed dies for receiving a coupling sleeve between them and compressing it radially, frame means supporting the lower die for vertical movement and pivotally supporting the upper die thereon to accommodate opening of the space between the dies, means for moving said lower die upward to close said die under pressure on the sleeve, guide track means rigidly supported on said frame means and extending a considerable distance to opposite sides of said dies parallel to the longitudinal axis of said dies, a pair of cable end supports fixedly mounted at opposite ends of said guide track means in longitudinal alignment with said dies, a cable clamp freely slidable longitudinally on said guide track means between one of said supports and said dies normally in spaced relation to said one support, a cable clamp carriage slidable longitudinally on said guide track means between the other of said supports and said dies normally in spaced relation to said other support, said cable clamp and said carriage each having portions interfitting with said guide track means to be positively retained by said guide track means against all movement other than sliding movement longitudinally of the longitudinal axis of said dies, said cable clamp and said carriage each including upper and lower smooth surfaced jaws in longitudinal alignment with said dies and said supports for clamping therebetween of a portion of the respective cable end outwardly of the coupling sleeve fixedly to retain the cable ends on said cable clamp and said carriage respectively, the upper jaw of the clamping jaws on each of said cable clamp and said carriage being movably mounted thereon to accommodate opening of the space between said jaws to accommodate, upon opening of the space between said dies, insertion and removal of uncoupled and coupled cable ends and coupling sleeves, and drive means operatively associated with said carriage and said guide track means for positively moving said carriage in either direction on said guide track means.

4. In a press for applying a coupling sleeve to a pair of cable ends, a rigid frame, a pair of vertically opposed dies on said frame for receiving a coupling sleeve between them, the upper one of said dies being pivotally mounted to one side of said frame to open and close the space between said dies to accommodate generally radially downward insertion and generally radially upward removal of cable ends and coupling sleeves into and out of the space between said dies, a clamp on said frame to the other side thereof engageable with said upper die to clamp the same in closed position to confine a coupling sleeve between said dies, a power ram operatively associated with the lower one of said dies to close said dies under pressure onto the sleeve to compress a portion of the sleeve radially onto a pair of cable ends, said ram being operable to compress incrementally the entire length of the sleeve step by step onto the cable ends, a pair of spaced parallel horizontal bars supported on said frame parallel to the longitudinal axis of said dies and extending a considerable distance to opposite sides of said dies, stationary guides fixedly connected to and connecting the ends of said bars, cable end supports fixedly secured to said guides, each of said cable end supports being smooth surfaced and upwardly open and being aligned axially and substantially horizontally with the space between said dies, a cable clamp freely slidable on said bars between one of said supports and said dies normally in spaced relation to said one support and retained by said bars against all movement other than sliding movement longitudinally of said bars, said cable clamp including vertically opposed smooth surface jaws the upper one of which is pivotally mounted to open and close the space between said jaws to accommodate generally radially downward insertion and generally radially upward removal of a cable into and out of the space between said jaws, a cable carriage slidably mounted on said bars between the other of said supports and said dies normally in spaced relation to said other support and retained by said bars against all movement other than sliding movement longitudinally of said bars, said carriage including vertically opposed smooth surfaced jaws the upper one of which is pivotally mounted to open and close the space between said jaws to accommodate generally radially downward insertion and generally radially upward removal of another cable into and out of the space between said jaws, said dies, the jaws of said cable clamp and said carriage, and said supports being axially and substantially horizontally aligned rigidly to support two cable ends and a coupling sleeve in axial alignment, each of said bars having a rack on the lower surface thereof to the side of said dies to which said carriage is mounted, said carriage rotatably supporting a pair of pinions meshing respectively with said racks, a common shaft secured to said pinions and mounted for rotation in said carriage, said shaft being rotatable to move said carriage toward and away from said dies to move two cable ends and a coupling sleeve and said cable clamp with respect to said dies when the dies are not closed, and means for rotating said shaft to move incremental portions of the coupling sleeve between said dies between successive operations of said ram to effect step by step compression of the entire length of the sleeve while the cable ends and sleeve are rigidly supported in axial alignment.

References Cited in the file of this patent

UNITED STATES PATENTS

| | | |
|---|---|---|
| 676,292 | Wigtel | June 11, 1901 |
| 797,669 | Dems | Aug. 22, 1905 |
| 2,390,598 | Lepkowski | Dec. 11, 1945 |
| 2,530,969 | Johnson | Nov. 21, 1950 |